No. 787,650. PATENTED APR. 18, 1905.
E. T. TURNEY.
SPEED INDICATOR.
APPLICATION FILED JULY 28, 1904.
2 SHEETS—SHEET 1.
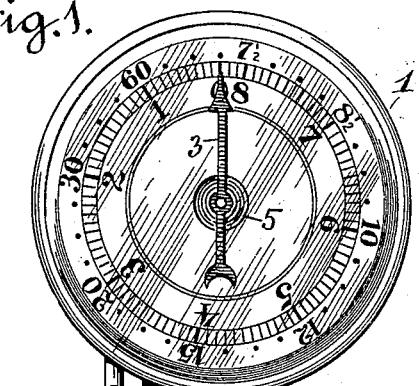
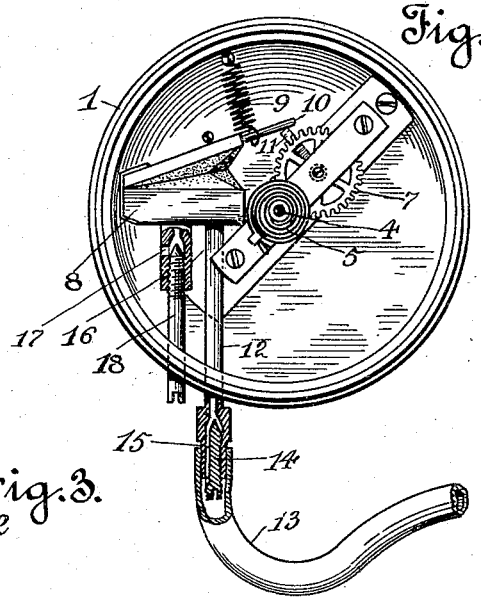
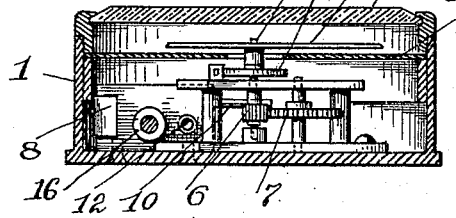
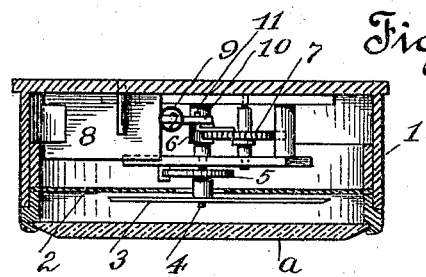
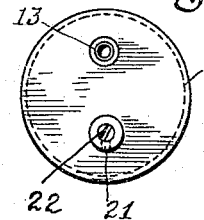
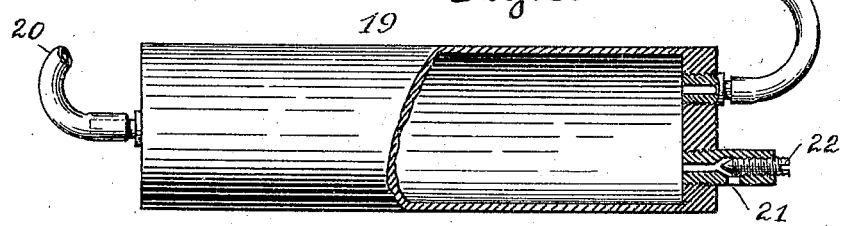
Witnesses.
Inventor
Eugene T. Turney
by Wm. F. Booth
his Attorney.

No. 787,650. PATENTED APR. 18, 1905.
E. T. TURNEY.
SPEED INDICATOR.
APPLICATION FILED JULY 28, 1904.
2 SHEETS—SHEET 2.
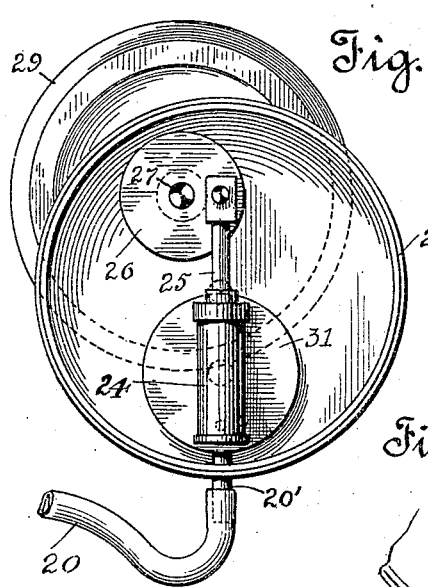
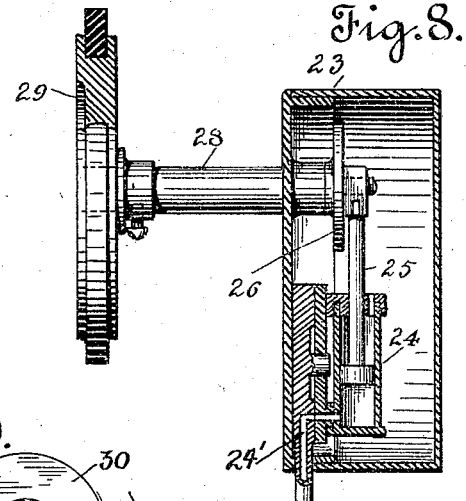
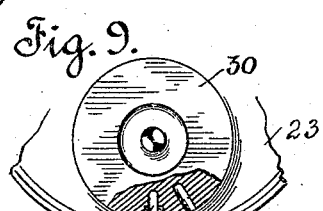
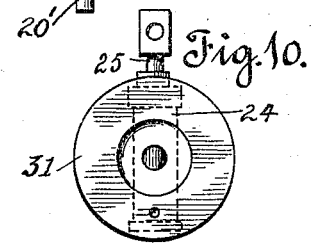
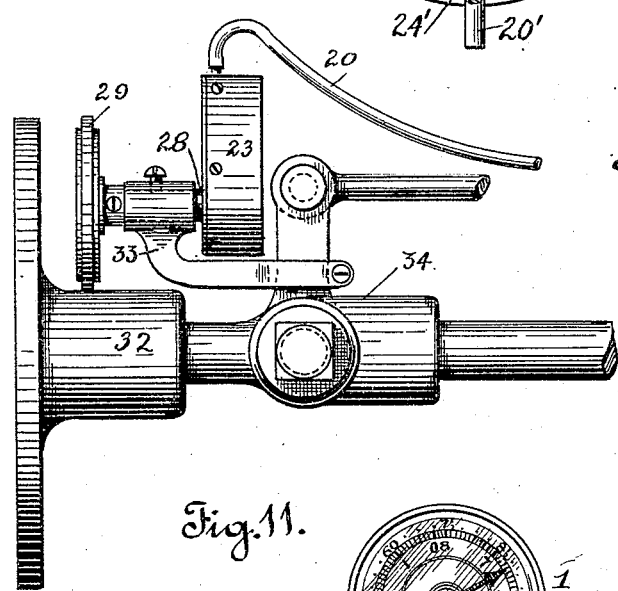
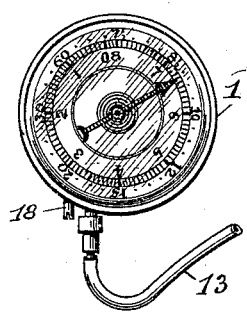
Witnesses.
Inventor.
Eugene T. Turney
by Wm. F. Booth
his Attorney.

No. 787,650.

Patented April 18, 1905.

UNITED STATES PATENT OFFICE.

EUGENE T. TURNEY, OF SAN RAFAEL, CALIFORNIA.

SPEED-INDICATOR.

SPECIFICATION forming part of Letters Patent No. 787,650, dated April 18, 1905.

Application filed July 28, 1904. Serial No. 218,485.

*To all whom it may concern:*

Be it known that I, EUGENE T. TURNEY, a citizen of the United States, residing at San Rafael, Marin county, State of California, have invented certain new and useful Improvements in Speed-Indicators; and I do hereby declare the following to be a full, clear, and exact description of the same.

My invention relates to the class of speed indicators or meters intended for use in connection with any traveling body, whether vessel or vehicle, but particularly adapted for measuring the speed of automobiles.

The object of my invention is to provide a simple, sensitive, and accurate speed-measurer.

My invention consists, primarily, in the combination of an indicating-needle, pneumatically-operated controllable means for actuating the needle, and a mechanism operated by the traveling body conformably to its speed for establishing pneumatic pressure. It also consists in means for regulating the pneumatic pressure and in the novel combinations, arrangement, and construction of parts, which I shall now describe.

Referring to the accompanying drawings, Figure 1 is a front view of the needle-casing and dial. Fig. 2 is a front view of the needle-casing with the glass front, the needle, and dial removed in order to show the interior parts. Fig. 3 is a cross-section of the needle-casing, the interior parts being shown in full elevation. Fig. 4 is a section similar to Fig. 3 looked at from the opposite side, the casing being inverted. Fig. 5 is an elevation, partly in section, of the reservoir-controller. Fig. 6 is an end view of the same. Fig. 7 is a front view of the exhaust-mechanism casing, the cover being removed to show the interior parts. Fig. 8 is a side view of the same, the casing being in sections and its cover in place. Fig. 9 is a detail of the fixed plate of the pump-bed, partly broken to show the ports. Fig. 10 is a view of the oscillating plate of the pump-bed. Fig. 11 is a general view of the three main parts of the apparatus—namely, the needle mechanism, the reservoir-controller, and the exhaust mechanism, the latter being shown applied to a wheel-hub and all the parts assembled to indicate their relations.

The indicator as a whole, as is shown in Fig. 11, consists of three general parts, which may be called the "needle mechanism" 1, the "reservoir-controller" 19, and the "exhaust mechanism" 23, respectively. These I shall describe in the order stated.

Referring to Figs. 1, 2, 3, and 4, 1 is a casing having a glass front $a$, below which is the dial 2, suitably marked. A good style of marking is that here shown, consisting of a graduated circle, with outer figures indicating miles and inner figures indicating minutes. Over this dial plays the needle 3. The needle is carried by an arbor 4, controlled by a spring 5 and actuated by a pinion 6, with which a gear 7 engages.

Within the casing 1 is a suitable device affected by pneumatic pressure. The device here shown is in the form of a bellows 8, the movable leaf of which is controlled by a spring 9. (Best seen in Fig. 2.) This leaf carries an arm 10, which is adapted to come in contact with an arm 11, secured to the gear 7, Figs. 2 and 4. Let into the fixed leaf of the bellows and communicating with the interior is an exhaust-pipe 12, the outer end of which projects through the casing 1, as seen in Fig. 2, and has connected with it an exhaust-tube 13, preferably a flexible one. In the exhaust-pipe 12 is a needle-valve 14 to control its capacity to such an extent that the indicating-needle will not feel the impulses of the exhaust-pump. The stem of said valve is filed away on one side, as shown at 15, in order to provide a passage into the main connecting exhaust-tube 13, Fig. 2. It will now be seen that if the air in the tube 13 be exhausted the bellows 8 will collapse, causing the movable leaf thereof, through the arms 10 and 11, to turn the gear 7, which, through the pinion 6, will swing the needle 3. Upon relieving the exhaust the spring 9 will expand the bellows again and the spring 5 will return the needle. The pressure due to the exhaust can be accurately controlled by the valve 14. In order, however, to render the return of the needle more rapid, whereby its operation is more sensitive, said return is not wholly dependent on the relief in the main tube 13, which would be too slow. To effect a more rapid and sensitive relief, there is let into the bellows a relief-pipe 16, (see Fig. 2,) having an air-inlet 17 and a controlling needle-valve 18, the outer end of which projects through the casing 1 in order that it may be operated from the outside. It follows, therefore, that when the exhaust is relieved in the main tube 13 the air passing in through the inlet 17 will instantly expand the bellows. This operation can be accurately controlled by the valve 18, whereby the needle 3 is made as sensitive as desired.

The reservoir-controller, Figs. 5 and 6, consists of a casing 19, with which the main exhaust-tube 13 communicates. With this casing also communicates a second exhaust-tube 20, which leads to the exhaust-pump. The casing 19 is provided with an air-inlet 21, controlled by a needle-valve 22. By regulating this valve the degree of the exhaust in the reservoir can be nicely determined to suit the calibration of the dial 2 and to adjust said dial to the particular body the speed of which is to be determined.

The exhaust mechanism, Figs. 7 to 10, consists of a casing 23, within which is mounted suitably an oscillating air-pump 24, with the intake-port 24' of which the exhaust-tube 20 from the reservoir-casing 19 communicates, said tube being fitted upon the nipple 20', as seen in Fig. 7. The piston-rod 25 of the pump is driven by a crank 26 on a shaft 27, Fig. 7, projecting through the casing in a sleeve 28, Fig. 8, and having secured on its end a friction or other wheel 29 or other rotating part by which the shaft is driven. An effective way in which to mount the pump 24 is by means of the fixed bed-plate 30 and the oscillating bed-plate 31 fitted thereon.

I do not deem it necessary herein to indicate any particular arrangement or application of the device to any moving vehicle or vessel the speed of which is to be indicated. It is obvious that the shaft 27 may be driven by any device or part the rotation or movement of which bears any relation to the speed of the moving body. It is sufficient, therefore, to show, as I have done in Fig. 11, such a device as the friction-wheel 29 in contact with the hub 32, which may be the hub of a wheel of any vehicle.

It will be understood that the device as a whole will be suitably disposed as to the arrangement and support of its parts to adapt it conveniently to the vehicle to which it is applied. In Fig. 11 the exhaust mechanism is shown supported by a bracket 33 from the axle connections 34 of the hub 32.

The operation is as follows: The proper relation of the calibration of the dial to the vehicle having been regulated by the adjustment of the valve 22 in the controller-casing 19 and the vehicle placed in motion, the shaft 27 is driven with a speed conformable to that of the vehicle-wheel. The pump 24 exhausting through tubes 20 and 13 and intervening controller-casing 19, the needle 3 is moved, as heretofore described.

Having thus described my invention, what I claim as new, and desire to secure by Letters Patent, is—

1. A speed-indicator consisting of an indicating needle and dial, means operated by pneumatic exhaust for actuating the needle, a mechanism controlled by the travel of the body, the speed of which is to be indicated, for establishing said exhaust and a means for regulating said established exhaust conformably to the calibration of the needle-dial.

2. A speed-indicator consisting of an indicating needle and dial, means operated by pneumatic exhaust for actuating the needle, a mechanism controlled by the travel of the body, the speed of which is to be indicated, for establishing said exhaust, and a means for regulating said established exhaust conformably to the calibration of the needle-dial consisting of an air-reservoir let into the exhaust connections, said reservoir being provided with an air-inlet and an adjustable valve controlling said inlet.

3. A speed-indicator consisting of an indicating-needle, a bellows, and mechanism by which the movement of the bellows actuates the needle, an air-exhaust device operated and controlled by the travel of the body, the speed of which is to be indicated, exhaust connections from said device to the bellows, and an adjustable valve controlling the communication between said exhaust connections and the bellows.

4. A speed-indicator consisting of an indicating-needle, a bellows, and mechanism by which the movement of the bellows actuates the needle, an air-exhaust device operated and controlled by the travel of the body, the speed of which is to be indicated, exhaust connections from said device to the bellows, and means for relieving the exhaust-pressure on the bellows consisting of an air-inlet to the bellows, and an adjustable valve controlling said inlet.

5. A speed-indicator consisting of an indicating-needle, a bellows, and mechanism by which the movement of the bellows actuates the needle, an air-exhaust device operated and controlled by the travel of the body, the speed of which is to be indicated, exhaust connections from said device to the bellows, and an adjustable valve controlling the communication between said exhaust connections and the bellows, and means for relieving the exhaust-pressure on the bellows consisting of an air-inlet to the bellows, and an adjustable valve controlling said inlet.

6. A speed-indicator consisting of a spring-controlled, indicating-needle, a spring-controlled exhaust-bellows, and mechanism by which the collapsing of the bellows actuates the needle, an air-exhaust device operated and controlled by the travel of the body, the speed of which is to be indicated, exhaust connections from said device to the bellows, and means for relieving the exhaust-pressure on the bellows consisting of an air-inlet to the bellows, and an adjustable valve controlling said inlet.

7. A speed-indicator consisting of an indicating-needle, an exhaust-bellows, and mechanism by which the movement of the bellows actuates the needle, an air-exhaust device operated and controlled by the travel of the body, the speed of which is to be indicated, exhaust connections from said device to the bellows, and an air-reservoir let into the exhaust connections, said reservoir being provided with an air-inlet and an adjustable controlling-valve.

8. A speed-indicator consisting of an indicating-needle, an exhaust-bellows, and mechanism by which the movement of the bellows actuates the needle, an air-exhaust device operated and controlled by the travel of the body, the speed of which is to be indicated, exhaust connections from said device to the bellows, an air-reservoir let into the exhaust connections, said reservoir being provided with an air-inlet and an adjustable controlling-valve, and means for relieving the exhaust-pressure on the bellows consisting of an air-inlet to the bellows and an adjustable valve controlling said inlet.

9. A speed-indicator consisting of an indicating-needle, an exhaust-bellows, and mechanism by which the movement of the bellows actuates the needle, an air-exhaust device operated and controlled by the travel of the body, the speed of which is to be indicated, exhaust connections from said device to the bellows, an air-reservoir let into the exhaust connections, said reservoir being provided with an air-inlet and an adjustable controlling-valve, means for relieving the exhaust-pressure on the bellows consisting of an air-inlet to the bellows and an adjustable valve controlling said inlet, and an adjustable valve controlling the communication between the exhaust connections and the bellows.

10. A speed-indicator consisting of an indicating needle and dial, means operated by pneumatic exhaust for actuating the needle, an exhaust-pump, driving mechanism for the pump operated by the traveling body conformably to its speed, exhaust connections from said pump to the needle-actuating means, and a means let into said exhaust connections for regulating the exhaust-pressure conformably to the calibration of the needle-dial.

11. A speed-indicator consisting of an indicating-needle, means operated by pneumatic exhaust for actuating the needle, an exhaust-pump, driving mechanism for the pump operated by the traveling body conformably to its speed, exhaust connections from said pump to the needle-actuating means, and an air-reservoir let into the exhaust connections, said reservoir being provided with an air-inlet and an adjustable valve controlling said inlet.

12. A speed-indicator consisting of an indicating-needle, an exhaust-bellows, and mechanism by which the movement of the bellows actuates the needle, an exhaust-pump, driving mechanism for the pump operated by the traveling body conformably to its speed, exhaust connections from said pump to the bellows, and means for relieving the exhaust-pressure on the bellows consisting of an air-inlet to the bellows and an adjustable valve controlling said inlet.

13. A speed-indicator consisting of an indicating-needle, an exhaust-bellows, and mechanism by which the movement of the bellows actuates the needle, an exhaust-pump, driving mechanism for the pump operated by the traveling body conformably to its speed, exhaust connections from said pump to the bellows, and an air-reservoir let into the exhaust connections, said reservoir being provided with an air-inlet and an adjustable valve controlling said inlet.

14. A speed-indicator consisting of an indicating-needle, an exhaust-bellows, and mechanism by which the movement of the bellows actuates the needle, an exhaust-pump, driving mechanism for the pump operated by the traveling body conformably to its speed, exhaust connections from said pump to the bellows, means for relieving the exhaust-pressure on the bellows consisting of an air-inlet to the bellows and an adjustable valve controlling said inlet, and an air-reservoir let into the exhaust connections, said reservoir being provided with an air-inlet and an adjustable valve controlling said inlet.

15. A speed-indicator consisting of an indicating-needle, an exhaust-bellows, and mechanism by which the movement of the bellows actuates the needle, an exhaust-pump, driving mechanism for the pump operated by the traveling body conformably to its speed, exhaust connections from said pump to the bellows, means for relieving the exhaust-pressure on the bellows consisting of an air-inlet to the bellows and an adjustable valve controlling said inlet, an air-reservoir let into the exhaust connections, said reservoir being provided with an air-inlet and an adjustable valve controlling said inlet, and an adjustable valve controlling the communication between said exhaust connections and the bellows In witness whereof I have hereunto set my hand.

EUGENE T. TURNEY.

Witnesses:
WALTER F. VANE,
D. B. RICHARDS.